(12) United States Patent
Loomis

(10) Patent No.: US 6,430,416 B1
(45) Date of Patent: Aug. 6, 2002

(54) HYBRID RADIO LOCATION SYSTEM USING A COMBINATION OF SATELLITE PSEUDORANGES AND RADIO PSEUDORANGES

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/440,811

(22) Filed: Nov. 15, 1999

(51) Int. Cl.$^7$ ................................................. H04Q 7/20
(52) U.S. Cl. ................... 455/456; 342/357.02; 701/214
(58) Field of Search ................................ 455/456, 457; 342/357.04, 357.09, 358, 450, 453, 357.02; 701/213, 214

(56) References Cited

U.S. PATENT DOCUMENTS

| | | | |
|---|---|---|---|
| 5,317,323 A | 5/1994 | Kennedy et al. | 342/457 |
| 5,594,740 A | 1/1997 | LaDue | 379/59 |
| 5,889,474 A | 3/1999 | LaDue | 340/825.49 |
| 5,920,287 A | 7/1999 | Belcher et al. | 342/450 |
| 5,929,806 A | 7/1999 | Birchler et al. | 342/357 |
| 5,999,124 A * | 12/1999 | Sheynblat | 342/357.01 |
| 6,230,018 B1 * | 5/2001 | Watters et al. | 340/988 |
| 6,252,543 B1 * | 6/2001 | Camp | 327/291 |

FOREIGN PATENT DOCUMENTS

WO    WO99/54752    12/1995

\* cited by examiner

Primary Examiner—Daniel Hunter
Assistant Examiner—Nick Corsaro
(74) Attorney, Agent, or Firm—David R. Gilda

(57) ABSTRACT

A hybrid positioning system for locating an object using a combination of a GPS pseudoranges and local radio pseudoranges. The system includes one or more receptors coupled to a base station, and one or more location markers. The location markers are located with an object whose location is to be determined. Each of the location markers includes a GPS receiver for determining GPS pseudoranges and a radio transmitter for transmitting a radio signal including the GPS pseudoranges and information about the object. Each of the receptors passes the radio signal to the base station as an interface signal. The base station includes a radio pseudorange detector, a base GPS receiver, and a hybrid pseudorange processor. The radio pseudorange detector uses the times-of-arrival of the interface signals and the known interface signal transit times for determining radio pseudoranges from the location marker to the receptors. The base GPS receiver determines the locations-in-space of GPS satellites. The hybrid pseudorange processor uses a combination of the known locations of the receptors with the radio pseudoranges and the locations-in-space of the GPS satellites with the GPS pseudoranges for determining the location of the object.

6 Claims, 6 Drawing Sheets

HYBRID RADIO LOCATION SYSTEM USING A COMBINATION OF SATELLITE PSEUDORANGES AND RADIO PSEUDORANGES

BACKGROUND OF THE INVENTION

1. Field of the Invention

The invention relates generally to positioning systems and more particularly to a hybrid positioning system for locating and tracking an object using a combination of GPS, pseudoranges determined at the object from the global positioning system and radio pseudoranges determined for a radio signal transmitted from the object through one or more receptors to a base station.

2. Description of the Prior Art

There are many applications where it is necessary for a base station to know the position, identification and contents of a remote object. For example, asset management systems require periodic identification of the location and contents of remote containers in a warehouse and in transit. Cellular telephone service according to FCC regulations will soon require location of a cellular telephone that dials 911. Vehicle dispatch systems are required to track the locations of fleet vehicles. Applications as diverse as mining, agriculture, road paving, forestry, and construction require the precise locations of active machinery. The location accuracy required by such applications varies from several hundred meters for a container on a ship at sea to a few centimeters for active machinery.

The global positioning system (GPS) has now become the standard for location and navigation applications where a GPS receiver has clear view of a major portion of the sky. The GPS receiver uses GPS signals for determining ranges to GPS satellites, called pseudoranges because the internal clock in the GPS receiver is not synchronized to GPS time until the location of the GPS receiver is known. The location of the GPS receiver is calculated from the pseudoranges and ephemeris data for the locations-in-space of the GPS satellites. When location is needed at a base station but not at the GPS receiver, the GPS receiver transmits the GPS pseudoranges along with the satellite identifications and measurement times to the base station where current ephemeris data is stored. With differential GPS corrections, suitably equipped GPS receivers conventionally achieve location accuracy of a few meters to less than a meter. However, the GPS signal is relatively weak when it reaches the Earth from a GPS satellite and the additional attenuation of passing through foliage, into a building, around canyon or building walls, or the like may effectively block some or all the GPS signals. Furthermore, multipath of the GPS signal due to buildings or canyon walls and other objects may significantly reduce the accuracy of the location.

Normally, GPS signals from four GPS satellites are required for determining location. A location can be determined from fewer than four GPS satellites when other location information such as altitude, time, or map matching is available. However, more than four GPS satellites are often used for an overdetermined solution in order to improve accuracy. Existing GPS applications use pseudolites to augment the satellite constellation and thus improve availability of the GPS signal. Such pseudolites mimic the satellite transmissions by broadcasting pseudo GPS signals, but are fixed on the ground and transmit the location-determination information appropriate to the geographical location of the pseudolite. Signal reception is nearly guaranteed when the pseudolite is located nearby due to relatively higher signal strength of the received pseudo GPS signal. The pseudolites make use of PRN codes that have not been allocated for GPS satellites. In addition to the thirty-two PRN codes allocated for GPS satellites the United States government currently allocates about four codes for the use of pseudolites. For example, a pair of pseudolites at the end of an airport's runway are conventionally used to enhance the position determination of a GPS navigational receiver in a landing aircraft. When the number of GPS satellites that can be received is fewer than the desired number due to impediments in the signal paths from the GPS satellites, the GPS signal is said to be partially blocked. It has been proposed that several pseudolites be used in a metropolitan area in order to improve GPS service in urban canyons and inside of buildings. Unfortunately, the use of GPS pseudolites has been limited due to their expense, the limited number of codes that have been allocated, and the possibility of jamming the satellite signals. The benefit of pseudolites within or near buildings or canyons is further limited by the effect of signal multipath on location accuracies.

Many electronic location determination systems are available or have been proposed that could conceivably augment the GPS system to provide electronic location information to a user equipped with a location determination receiver. Ground-based location determination systems, such as Loran, Omega, TACAN, Decca, U.S. Airforce Joint Tactical Information Distribution System (JTIDS Relnav), or U.S. Army Position Location and Reporting System (PLRS), use the intersection of hyperbolic lines or surfaces to provide location information. Unfortunately, none of these systems provide the location accuracy that is sometimes required. For example, LORAN-C provides a location accuracy that is typically within about 400 meters depending upon local conditions. A limitation of a LORAN-C location determination system is that not all locations in the northern hemisphere, and few or no locations in the southern hemisphere, are covered by LORAN-C. A second limitation of LORAN-C is that the location accuracy is insufficient for many applications. A third limitation of LORAN-C is that weather, local electronic signal interference, poor crossing angles, closely spaced time difference hyperbolas, and skywaves frequently cause the accuracy to be significantly worse than 400 meters.

Other ground-based location determination devices use systems that were developed primarily for communications, such as cellular telephone, FM broadcast, and AM broadcast. Some cellular telephone systems provide estimates of location, using comparison of signal strengths from three or more sources. FM broadcast systems having subcarrier signals can provide estimates of location by measuring the phases of the subcarrier signals. U.S. Pat. No. 5,173,710 by Kelley et al. discloses a system that allows determination of a location of a vehicle. In Kelley et al. FM subcarrier signals are received from three FM radio stations with known locations but unknown relative phases by signal processors at the vehicle and at a fixed station having a known location. The fixed station processor determines the relative phases of the signals transmitted by the three FM radio stations and transmits the relative phase information to the vehicle. The vehicle processor determines its location from the FM subcarrier signal phases and from the relative phase information it receives. Unfortunately, all of these systems are limited by their lack of accuracy, multipath reduction of accuracy, the region of operation, and/or the cost of the receivers or required infrastructure.

There is a need for a system for augmenting the global positioning system for providing high accurary at a relatively low cost where GPS signals are partially blocked.

SUMMARY OF THE INVENTION

It is therefore an objective of the present invention to provide a hybrid location system for locating a remote object using a combination of the global positioning system (GPS) and a radio pseudoranging system.

Briefly, in a preferred embodiment, a hybrid location system of the present invention includes a base station, one or more receptors at known locations having known signal transit times to the base station, and one or more location markers. The location markers are located with an object whose location is to be determined. Each of the location markers includes a marker GPS receiver and a radio transceiver. The marker GPS receiver includes a GPS pseudorange detector for determining GPS pseudoranges. The radio transceiver includes a radio transmitter for transmitting a radio signal including information for the GPS pseudoranges, the identification of the location marker, and typically the contents, characteristics, and/or identification of the object. Each of the receptors includes a radio receiver for receiving the radio signal and a communication interface for forwarding the information in the radio signal to the base station. The base station includes a radio pseudorange detector, a base GPS receiver, and a hybrid pseudorange processor. The radio pseudorange detector uses the time-of-arrival of the interface signal and the calculated transit time for determining a radio pseudorange from the location marker to the receptor. The base GPS receiver provides the locations-in-space for GPS satellites and preferably determines differential corrections for the GPS pseudorange. The hybrid pseudorange processor uses radio pseudorange calculations using the measured radio pseudoranges and the known locations of the receptors; GPS pseudorange calculations using the measured GPS pseudoranges, the locations-in-space of the GPS satellites, and preferably the differential corrections, or a combination of radio and GPS pseudorange calculations for four or more radio and/or GPS pseudoranges for determining the location of the object. Preferably, the system is time synchronized by transmitting the radio signal according to a locally generated GPS reference time used for determining the GPS pseudoranges and determining the radio pseudoranges with actual GPS-based time provided by the base GPS receiver. One or more of the location markers may be located with one or more of the receptors, respectively, for determining the locations of the receptors.

An advantage of a hybrid location system is that a location of an object can be determined when GPS signals are partially blocked by augmenting the GPS system with low cost location markers, receptors, and a base station of the present invention.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
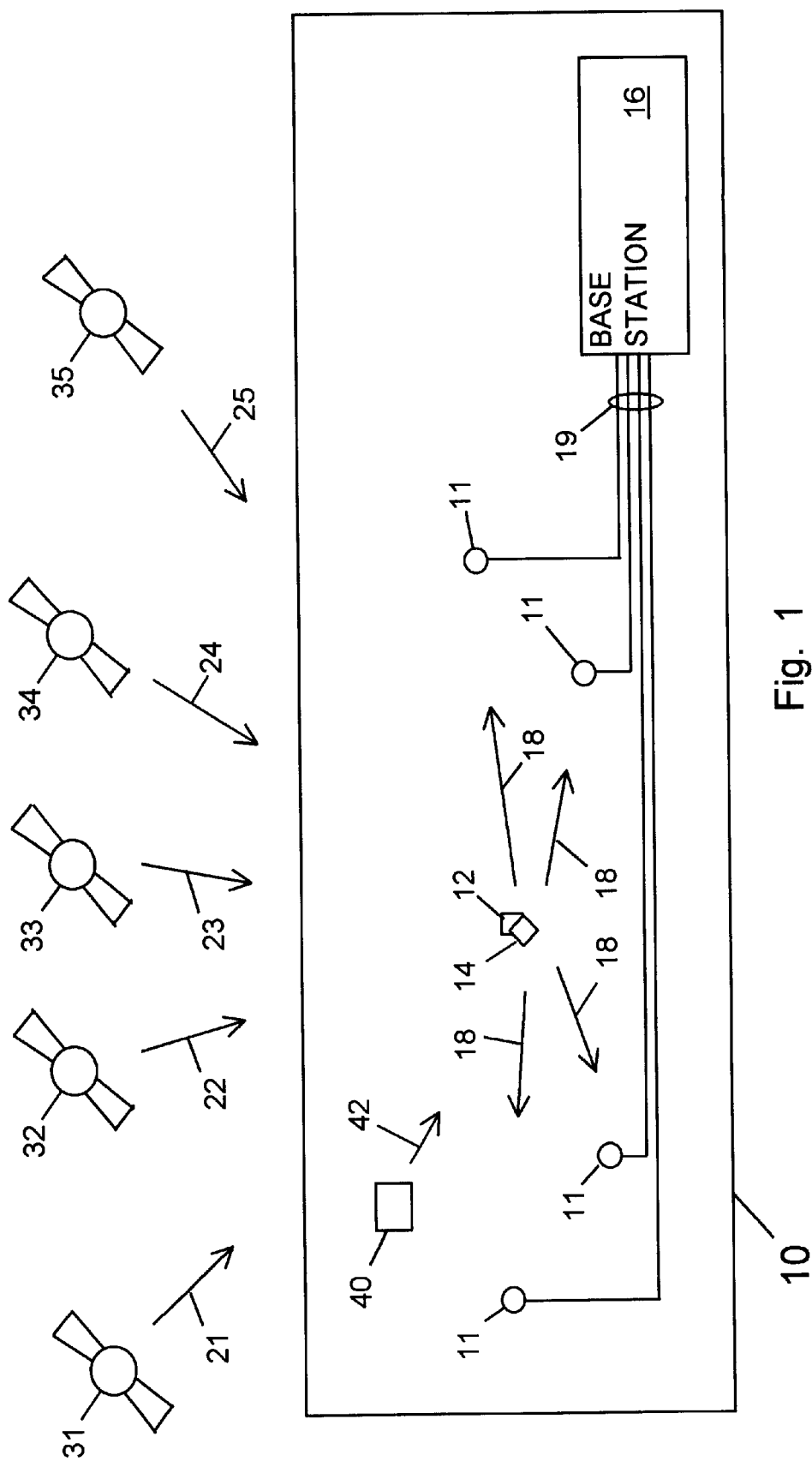
FIG. 1 is a diagram illustrating a hybrid location system of the present invention having a location marker and multiple receptors for locating and tracking an object.

FIG. 1 illustrates a hybrid location system of the present invention referred to by a reference number 10. The system 10 includes several receptors 11, at least one location marker 12 located with at least one object 14, respectively, and a base station 16. The location marker 12 transmits a radio signal 18. The receptors 11 that receive the radio signal 18 pass representative interface signals 19, respectively, to the base station 16. Typically, the interface signals 19 are carried on coaxial cables. Alternatively, the interface signals 19 may be transmitted through the air via radio or optical signals.

The base station 16 receives and measures respective times-of-arrival of the interface signals 19 relative to clock time at the base station 16. The base station 16 determines the times-of-arrival of the radio signal 18 at the respective receptors 11 by subtracting known transit times between the respective receptors 11 and the base station 16 from the measured times-of-arrival at the base station 16. The propagation speed of the radio signal 18, approximately the speed of light for air, is then used for converting the times-of-arrival at the receptors 11 to radio ranges between the location marker 12 and the receptors 11. The radio ranges are termed radio pseudoranges because the clocks in the location marker 11 and the base station 16 may not be synchronized.

In order to reduce clutter, the FIG. 1 illustrates only one location marker 12 associated with one object 14. However, it should be understood that the system 10 may include many units of the location marker 12 associated with many objects 14, respectively. Optionally, one or more of the location marker 12 is located with and used for locating one or more of the receptors 11, respectively.

The location marker 12 receives GPS signals 21–25 broadcast by GPS satellites 31–35, respectively, and measures GPS pseudoranges for selected ones of the GPS signals 21–25 for which the signal level is sufficiently strong. Typically, the signal level is sufficiently strong where the location marker 12 and the respective GPS satellite 31–35 have an unblocked line-of-sight between them. The radio signal 18 from the location marker 12 includes data for the GPS pseudoranges, an identification of the location marker 12, and information for the object 14. The object information may include an identification of the object 14, contents of the object 14, temperature or other characteristics of the object 14, destination of the object 14, and/or the like. The base station 16 then resolves the location of the location marker 12 and the object 14 from the GPS pseudoranges and the radio pseudoranges.

An optional interrogator 40 transmits an interrogation signal 42 including the identification of the location marker 12 in order to enter object information to the location marker 12 having that identification or to prompt that location marker 12 to transmit the radio signal 18.

Figure 2:
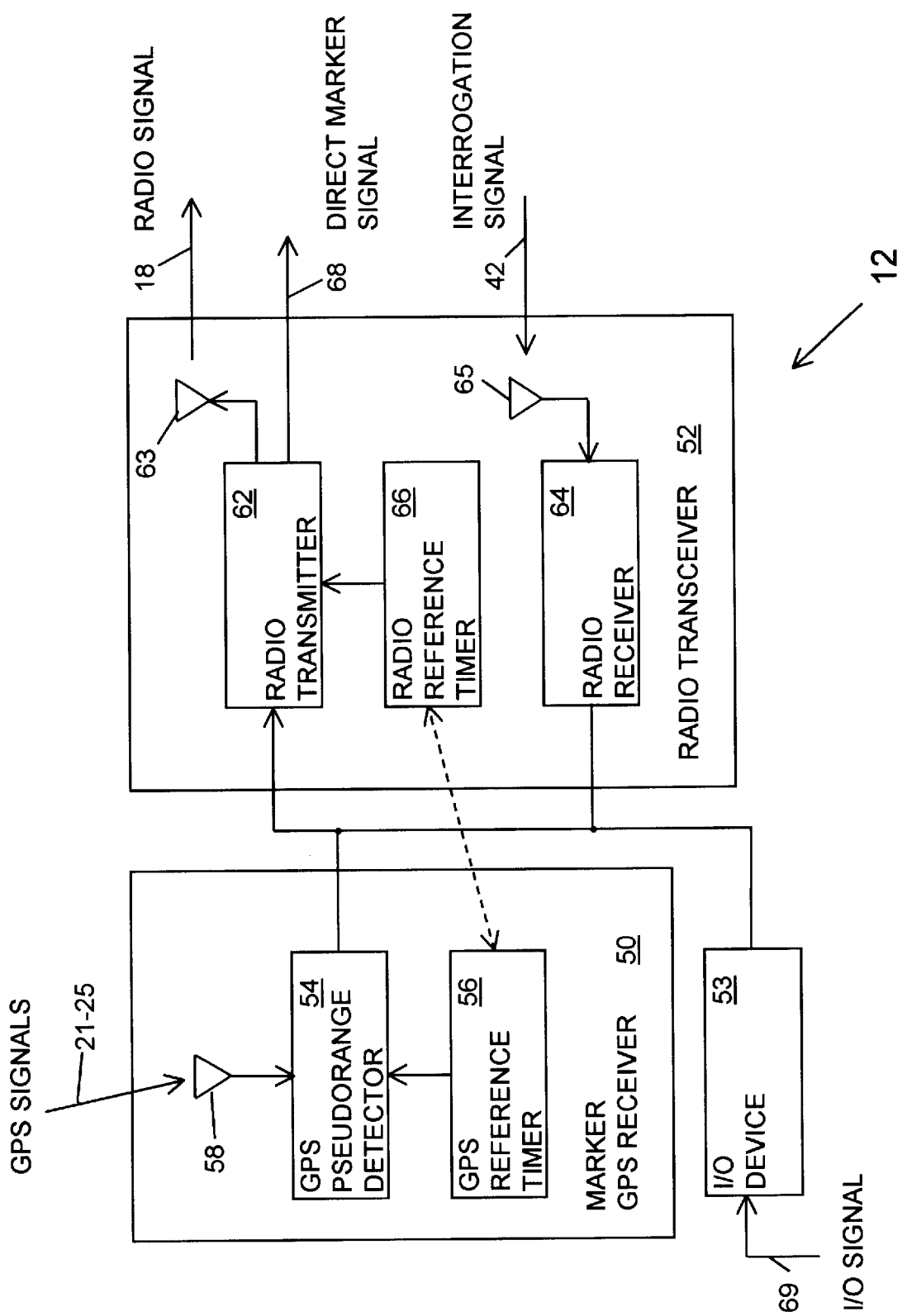
FIG. 2 is a block diagram of a location marker of the hybrid location system of FIG. 1.

FIG. 2 is a block diagram of the location marker of the present invention referred to by the reference number 12. The location marker 12 includes a marker GPS receiver 50, a radio transceiver 52, and an optional I/O device 53. The GPS receiver 50 includes a GPS pseudorange detector 54, a GPS reference timer 56, and a GPS antenna 58 for receiving whichever ones of the GPS signals 21–25 are receivable by having a sufficiently high signal level at the GPS antenna 58. At any one time any one or all of the GPS signals 21–25 may be receivable or any one or all of the GPS signals 21–25 may be unreceivable. The most common cause of the GPS signals 21–25 being unreceivable is signal blockage. Such signal blockage typically occurs when the GPS antenna 58 is inside of a building or automobile or when GPS antenna 58 is outside but the line-of-sight from the GPS antenna 58 to the GPS satellites 31–35 is blocked by nearby heavy machinery or the walls of a building or canyon.

The GPS reference timer 56 provides a local GPS reference time preferably having time ticks at one millisecond intervals derived from a GPS reference oscillator. The GPS reference timer 56 passes the local GPS reference time to the GPS pseudorange detector 54. The GPS pseudorange detector 54 uses the local GPS reference time for generating GPS replica signals having pseudorandom (PRN) codes matching the PRN codes broadcast from the GPS satellites 31–35. The GPS pseudorange detector 54 correlates the replica signals to the incoming GPS signals 21–25 in a conventional manner for determining PRN code phase offsets and measurement times when the code phase offsets are measured. The PRN code phase offsets are used as representative of the GPS pseudoranges.

The radio transceiver 52 includes a radio transmitter 62 including a radio antenna 63 for transmitting the radio signal 18, a radio receiver 64 including a radio antenna 65 for receiving the interrogation signal 42, and a radio reference timer 66 for providing a radio reference time signal. The radio transmitter 62 optionally provides a conducted direct marker signal 68 having the form and information of the radio signal 18. Preferably, the radio reference timer 66 and the GPS reference timer 56 use the same GPS reference oscillator or, if two oscillators are used, the radio reference timer 66 and the GPS reference timer 56 are phase locked together so that there is a known relationship between the GPS reference time signal and the radio reference time signal.

Object information such as the identification, contents, temperature, or destination of the object 14 may be received in an I/O signal 69 through the I/O device 53 directly from the object 14 or from a user; or through the radio receiver 64 from the interrogation signal 42. The radio receiver 64 is tuned for receiving the interrogation signal 42 through the radio antenna 65 and is coupled to the radio transmitter 62 for causing the radio transmitter 62 to transmit the radio signal 18 out of sequence when the interrogation signal 42 is received.

The radio transmitter 62 transmits the radio signal 18 as radio frequency (RF) bursts having a low duty cycle with a relatively slow random or pseudorandom timing. The RF signal in the bursts is modulated by relatively fast repeating pseudorandom (PRN) code sequences modulated with data for the GPS pseudoranges, the object information, and the identification of the location marker 12. The PRN code sequences within the bursts are synchronized to the radio reference time signal as a time base. Because of the low duty cycle of the bursts, the radio signals 18 from a plurality of location markers 12 in the same vicinity are unlikely to have a collision. Even if a collision does occur for one burst, due to the pseudorandom timing of the sequences there is a high degree of certainty that the bursts that collided at one time will be clear at the next time. Preferably, the radio signal 18 for each location marker 12 is direct sequence biphase modulated with the same spread spectrum code. However, different spread spectrum codes could be used for identifying which of the location markers 12 is transmitting the burst or for distinguishing multiple bursts received at the same time. Further, the spread spectrum code can be implemented by frequency hopping.

Figure 3:
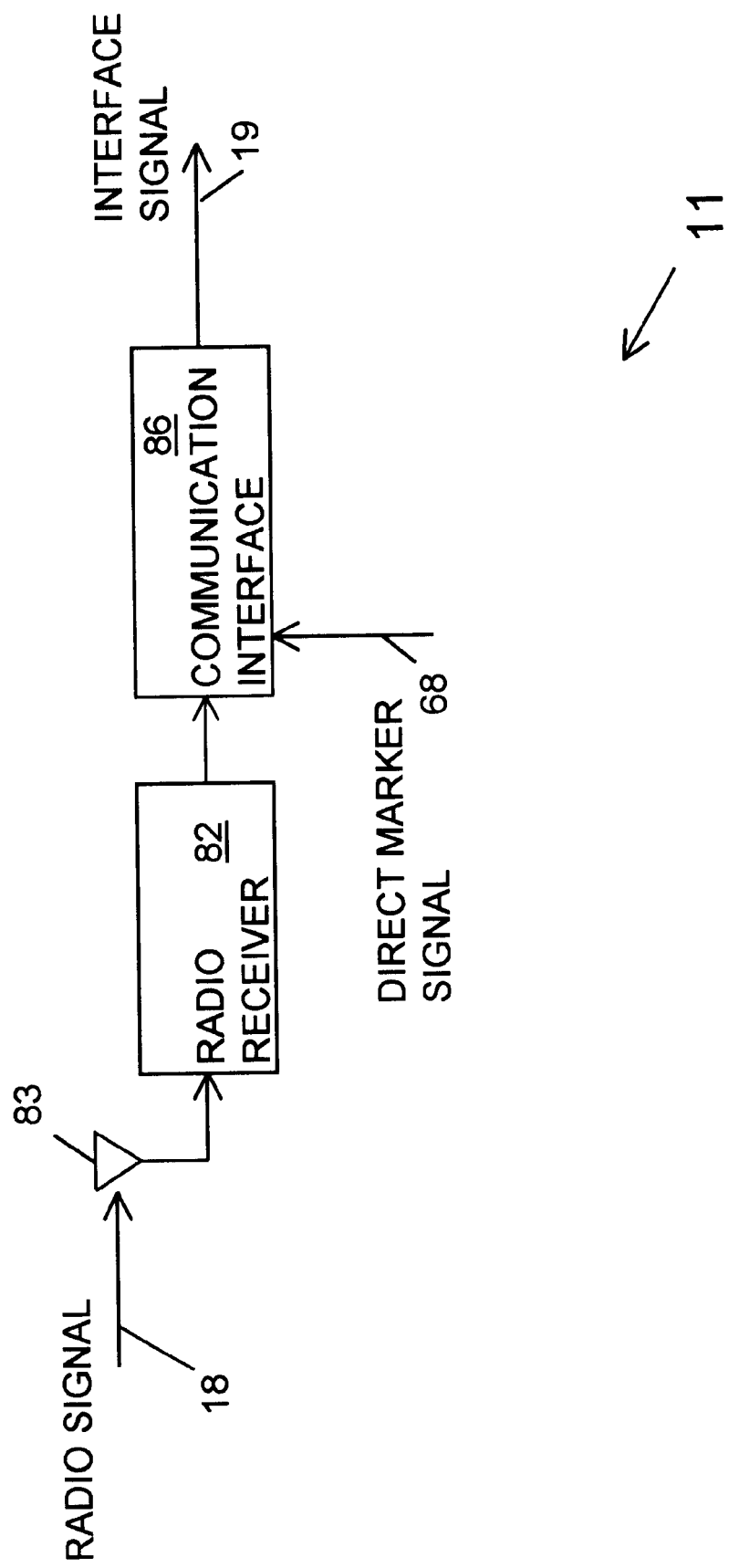
FIG. 3 is a block diagram of a receptor of the hybrid location system of FIG. 1.

FIG. 3 is a block diagram of the receptor of the present invention referred to by the reference number 11. The receptor 11 includes a radio receiver 82 including a radio antenna 83, and a communication interface 86. The radio receiver 82 receives the radio signal 18 from the remotely located location marker 12. The communication interface 86 couples to the radio receiver 82 for responsively transmitting the interface signal 19 including the GPS pseudoranges, object information, and marker identification to the base station 16. Preferably, the communication interface 86 receives a local oscillator (LO) signal and DC power through the same coaxial cable that is used for transmitting the interface signals 19 and passes the LO signal to the radio receiver 82.

The communication interface 86 includes an RF chock and an RF filter tuned to the frequency of the LO signal for separating the DC power and the LO signal, respectively, from the interface signal 19. Alternatively, the receptor 11 uses a battery or a power supply connected to AC line power for providing power for generating the LO signal internally; and transmits the interface signal 19 through an antenna over the air. The radio receiver 82 uses the LO signal to downconvert the RF frequency of the bursts of the radio signal 18 to an intermediate frequency (IF) signal and passes the IF signal to the communication interface 86. The communication interface 86 transmits the IF signal as the interface signal 19. Optionally, the communication interface 86 includes an amplitude detector for measuring the amplitude of the LO signal and an equalizer for using the LO signal amplitude for controlling the amplitude of the IF interface signal 19 to compensate for attenuation of the interface signal 19 between the receptor 11 and the base station 16.

The communication device 86 can be coupled to a locally located location marker 12B (FIG. 5) for receiving the direct marker signal 68 including the marker information for the GPS pseudoranges and identification in order to dynamically provide the location of a local receptor 11A (FIG. 5) as if the local receptor 11A were an object 14.

Figure 4:
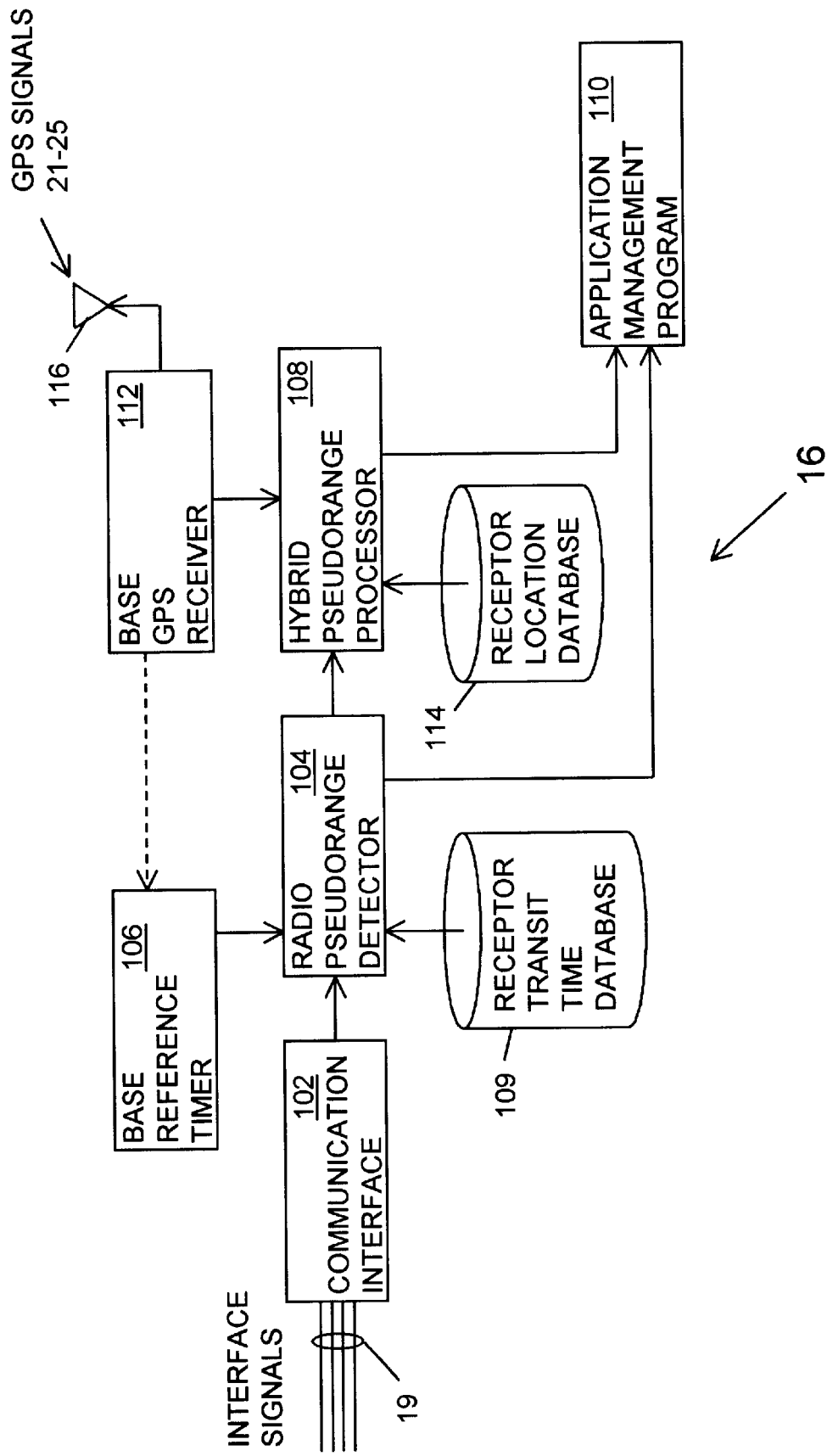
FIG. 4 is a block diagram of a base station of the hybrid location system of FIG. 1.

FIG. 4 is a block diagram of the base station of the present invention referred to by the reference number 16. The base station 16 includes a communication interface 102, a radio pseudorange detector 104, a base reference timer 106, a hybrid pseudorange processor 108, an interface transit time database 109, an application management program 110, a base GPS receiver 112, and an interface location database 114. Preferably, the communication interface 102 includes parallel channels where each channel is respectively associated with one of the receptors 11. Each channel includes an in-phase (I) and a quadrature phase (Q) downconverter for frequency downconverting the IF frequency bursts of the interface signal 19 to baseband, and parallel I and Q analog-to-digital converters (ADC)s for digitizing the baseband signals and issuing digitized I and Q signal bursts representative of the incoming interface signal 19. Alternatively, the downconverters and ADCs may operate serially in a time shared manner, or the ADCs may directly digitize the interface signal 19 without the requirement for the downconverters.

The communications interface 102 passes the digitized signal bursts including the GPS pseudoranges, the object information, and the marker identification to the radio pseudorange detector 104. Preferably, the pseudorange detector 104 includes parallel correlators having input channels corresponding to the channels of the communications interface 102, a replica generator, and a digital signal processor. The replica generator uses a base reference time signal provided by the base reference timer 106 as a time base for generating a replica of the spread spectrum code transmitted in the bursts from the location marker 12. The parallel correlators provide correlation signals for the correlation of the replica to the incoming digitized signal bursts for each channel.

The digital signal processor receives the correlation signals for each channel and determines the relative times-of-arrival with respect to the base reference time signal of the first detection of the burst from the location marker 12 through each of the receptors 11. The digital signal processor retrieves data from interface transit time database 109 for the transit time delay between the arrival of the radio signal 18 at the receptor 11 and the arrival of the corresponding interface signal 19 at the base station 16 and subtracts the transmit time delay from the relative measured time-of-arrival at the base station 16 for determining the time-of-arrival at the receptor 11. The digital signal processor then converts the time-of-arrival at the receptor 11 to a radio pseudorange by multiplying the time-of-arrival by the propagation speed for the radio signal 18. Normally, in air, the propagation speed can be considered to be the speed of light. It is necessary to select the first detection of the burst and not a later detection in order to find the time-of-arrival for the radio signal 18 that takes a direct path and not a reflected or multipath from the location marker 12 to the receptor 11, and/or from the receptor 11 to the base station 16. Signal timing information representative of the radio pseudorange and the marker identification associated with the radio pseudorange is passed to the hybrid pseudorange processor 108.

The information for the GPS pseudoranges, the marker identification, and the object information is detected within the radio pseudorange detector 104 from inversions in the correlation signals. The GPS pseudoranges are passed to the hybrid pseudorange processor 108. The object information is passed to the application management program 110.

The base GPS receiver 112 includes a GPS antenna 116 having a surveyed location placed in a position to receive all the GPS signals 21–25 from the GPS satellites 31–35 that are above the horizon. The GPS receiver 112 calculates the locations-in-space of the GPS satellites 31–35, calculates the pseudoranges based upon the surveyed location of the GPS antenna 116, and then measures the pseudoranges to the GPS satellites 31–35 from the GPS signals 21–25. Pseudorange corrections are determined from the differences between the measured and calculated GPS pseudoranges. The pseudorange corrections and the locations-in-space of the GPS satellites 31–35 are then passed to the hybrid pseudorange processor 108. The hybrid pseudorange processor 108 applies the pseudorange corrections to the GPS pseudoranges received from the location marker 12 for providing differentially corrected GPS pseudoranges. Preferably, the marker GPS receiver 50 (FIG. 2) and the base GPS receiver 112 are within 150 kilometers.

The hybrid pseudorange processor 108 uses a combination of the corrected GPS pseudoranges and the radio pseudoranges for determining the location of the location marker 12 according to GPS pseudorange equation 1 and radio pseudorange equation 2.

$$PR_{GPSi}=[(X-X_{si})^2+(Y-Y_{si})^2+(Z-Z_{si})^2]^{1/2}-B_{GPS} \quad (1)$$

$$PR_{rj}=[(X-X_{rj})^2+(Y-Y_{rj})^2+(Z-Z_{rj})^2]^{1/2}-(B_b-B_r) \quad (2)$$

In the equations 1 and 2: (X,Y,Z) is the location of the location marker 12 that is unknown until the equations are resolved; $PR_{GPSi}$ is the corrected measured GPS pseudorange between the ith one of the GPS satellites 31–35 and the location marker 12; $(X_{si},Y_{si},Z_{si})$ is the location-in-space of the ith GPS satellite that is known from calculations by the GPS receiver 112; $PR_{rj}$ is the measured radio pseudorange between the jth one of the receptors 11 and the location marker 12; $(X_{rj},Y_{rj},Z_{rj})$ is the known location of the jth receptor 11 retrieved from the interface location database 114; $B_{GPS}$ is a time bias of the locally generated GPS reference time from the GPS reference timer 56 (FIG. 2) with respect to an actual GPS-based time that is unknown until the equations are resolved, converted to a range bias using the propagation speed of the GPS signals 21–25; and time bias difference $(B_b-B_r)$, that is unknown until the equations are resolved, is the time bias $B_b$ for the base reference timer 106 with respect to the time bias $B_r$ for the radio reference timer 66 (FIG. 2), converted to a range bias using the propagation speed of the radio signal 18.

The GPS pseudorange equation 1 has four unknowns: the location (X,Y,Z) of the location marker 12 and the time bias $B_{GPS}$ of the GPS reference timer 56 (FIG. 2). When four of the GPS signals 21–25 are received the location marker 12 provides four GPS pseudoranges. When GPS ranging is preferred, the hybrid pseudorange processor 108 uses the four GPS pseudoranges in four of the GPS equation 1 for resolving the location (X,Y,Z) of the location marker 12 and eliminating the time bias $B_{GPS}$.

The radio pseudorange equation 2 has four unknowns: the location (X,Y,Z) of the location marker 12 and the time bias difference $(B_b-B_r)$ of the radio reference timer 66 (FIG. 2) with respect to the base reference timer 106. When none of the GPS signals 21–25 are received, or when it is more desirable to use radio pseudoranges, the hybrid pseudorange processor 108 uses four of the equations 2 for four of the receptors 11, respectively, for resolving the location (X,Y,Z) of the location marker 12 and eliminating the time bias difference $(B_b-B_r)$.

The combination of the GPS pseudorange equation 1 and the radio pseudorange equation 2 has five unknowns: the location (X,Y,Z) of the location marker 12, the time bias $B_{GPS}$ of the GPS reference timer 56 (FIG. 2) and the time bias difference $(B_b-B_r)$ of the base reference timer 106 with respect to the radio reference timer 66 (FIG. 2). The location (X,Y,Z) of the location marker 12 can then be resolved and the time bias $B_{GPS}$ and $(B_b-B_r)$ eliminated with any combination of five of the equations 1 and 2.

However, preferably the number of unknowns in the combination of the equations 1 and 2 is reduced to four by synchronizing or calibrating the radio reference timer 66 (FIG. 2) to the GPS reference timer 56 (FIG. 2) in order to have a calibrated relationship between the time bias $B_r$ and the time bias $B_{GPS}$; and 5eliminating the time bias $B_b$ by synchronizing or calibrating the base reference timer 106 to the actual GPS-based time provided by the GPS receiver 112. The calibration between the time bias $B_r$ and the time bias $B_{GPS}$ includes the time difference between the transit time from the GPS antenna 58 to the code phase offset measurement for receiving the GPS signals 21–25 and the transit time from the code generator to the radio antenna 63 for transmitting the radio signal 18. With the known relationship of time bias $B_{GPS}$ and time bias $B_r$, and elimination of time bias $B_b$, the time bias $B_{GPS}$ and the location (X,Y,Z)

of the location marker 12 can be resolved with any combination of four of the equations 1 and 2. In other words, any combination of four of the GPS pseudoranges from GPS satellites 31–35 and/or the radio pseudoranges to the radio receptors 11 can be used for determining the location of the location marker 12.

The combination of the equations 1 and 2 can be augmented by location information for altitude, precise time, map matching, inertial navigation, or dead reckoning for reducing the number of the GPS satellites 31–35 and/or receptors 11 that are required or for increasing the number of equations for providing an overdetermined resolution of the location (X,Y,Z) of the location marker 12.

The location (X,Y,Z) of the location marker 12 is then passed to the application management program 110. The application management program 110 uses the location (X,Y,Z) of the location marker 12 along with the object information for the object 14. Examples of the application management program 110 include: asset management for periodic identification of the location and contents or measured characteristics of inventory in a warehouse or in transit; cellular telephone 911 service according to FCC regulations for location of a cellular telephone dialing 911; vehicle dispatch systems for tracking the locations, contents, and/or characteristics of fleet vehicles; and machine control for mining, agriculture, road paving, forestry, and construction for tracking the locations of active machinery.

The interface location database 114 stores the location $(X_{rj}, Y_{rj}, Z_{rj})$ of the jth receptor 11 and interface transit time database 109 stores the interface time delay or transit time between the time-of-arrival of the radio signal is at the jth receptor 11 and the time-of-arrival of the interface signal 19 at the base station 16 that is used in the determination of the radio pseudorange $PR_{rij}$ for the radio pseudorange equation 2. There are several ways in which the location and transit time corresponding to the receptors 11 can be determined. One alternative is to survey the locations $(X_{rj}, Y_{rj}, Z_{rj})$ for the jth receptor 11 and $(X_{rk}, Y_{rk}, Z_{rk})$ for a kth one of the receptors 11. A reference one of the location markers 12 is then placed at surveyed reference location that is equidistant from the locations $(X_{rj}, Y_{rj}, Z_{rj})$ and $(X_{rk}, Y_{rk}, Z_{rk})$ and transmits the radio signal 18. The transit time can be determined using two of the radio pseudorange equation 2 and a calculated propagation time between the reference location and the location of the jth or kth receptor 11.

An alternative method for determining the location $(X_{rj}, Y_{rj}, Z_{rj})$ of the jth receptor 11 and the delay or transit time between the jth receptor 11 and the base station 16 uses M location markers 12 at surveyed locations transmitting respective radio signals 18 to N receptors 11. The locations of the N receptors 11 and the transit times from the N receptors 11 to the base station 16 can then be determined for a combination of M and N meeting the requirements of an equation 3.

$$M \geq (4N-1)/(N-1) \quad (3)$$

The equation 3 describes the number "M" of reference location markers 12 in terms of the number "N" of receptors 11 that are required for determining the locations and transit delay times for the N receptors 11. The equation 3 shows that the number "M" of location markers 12 at known locations must be greater than or equal to the combination of four times the number "N" of receptors 11 minus one divided by the combination of the number "N" of receptors 11 minus one. For example, the locations and transmit times of two (N=2) receptors 11 can be determined with seven location markers 12 (M=7) at surveyed locations; the locations and transit times of three (N=3) receptors 11 can be determined with six location markers 12 (M=6) at surveyed locations for three receptors 11 (N=3); or the locations and transit times of four (N=4) receptors 11 can be determined with five location markers 12 (M=5) at surveyed locations.

Figure 5:
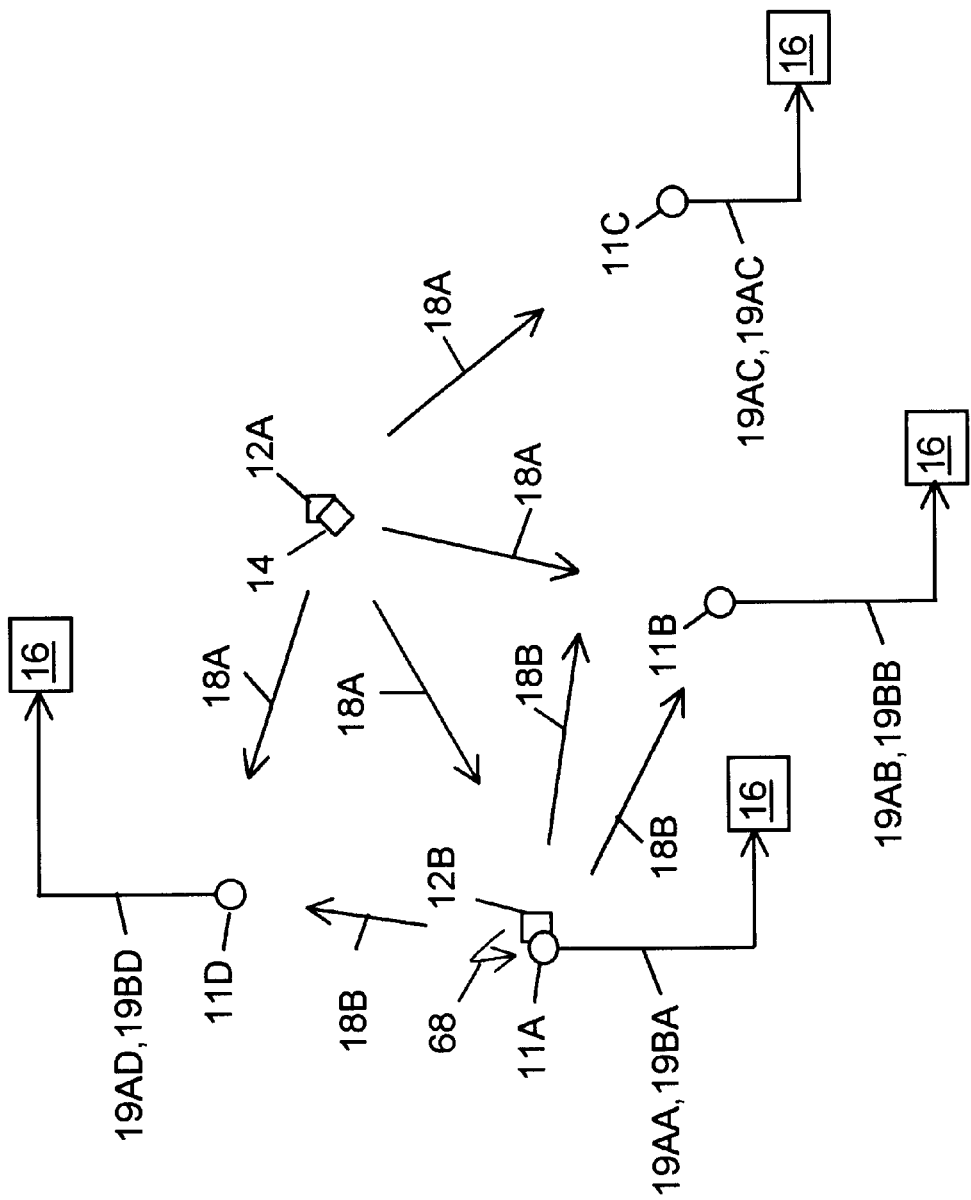
FIG. 5 is a diagram of illustrating an embodiment of the system of FIG. 1 having a location marker of FIG. 2 located with a receptor of FIG. 3 for providing a location of the receptor for use in determining the location of the object.

FIG. 5 is a diagram illustrating an embodiment of the system 10 having the base station 16; first, second, third, and fourth receptors 11 referred to by the modified reference numbers 11A, 11B, 11C, and 11D, respectively, having the character and structure of the receptors 11 described above; and first and second location markers 12 referred to by the modified reference numbers 12A and 12B, respectively, having the character and structure of the location marker 12 described above. The first location marker 11A is located with the object 14. The second location marker 11B is located with the first receptor 11A.

The first location marker 12A transmits a radio signal 18A and the second location marker 18B transmits a radio signal 18B respectively having the character of the radio signal 18 as described above. The first receptor 11A receives the radio signals 18A and issues a responsive representative interface signal 19AA to the base station 16. The first receptor 11A further receives the direct marker signal 68 directly from the second location marker 11B and issues a responsive representative signal 19BA to the base station 16. The second receptor 11B receives the radio signals 18A and 18B and issues responsive representative interface signals 19AB and 19BB, respectively, to the base station 16. The third receptor 11C receives the radio signals 18A and 18B and issues responsive representative interface signals 19AC and 19BC, respectively, to the base station 16. The fourth receptor 11D receives the radio signals 18A and 18B and issues responsive representative interface signals 19AD and 19BD, respectively, to the base station 16.

The radio pseudorange detector 104 (FIG. 4) in the base station 16 uses the time-of-arrival of the interface signal 19AA for determining a radio pseudorange between the location marker 12A and the receptor 11A; uses the time-of-arrival of the interface signal 19BA for determining a radio pseudorange between the location marker 12B and the receptor 11A; uses the time-of-arrival of the interface signal 19AB for determining a radio pseudorange between the location marker 12A and the receptor 11B; uses the time-of-arrival of the interface signal 19BB for determining a radio pseudorange between the location marker 12B and the receptor 11B; uses the time-of-arrival of the interface signal 19AC for determining a radio pseudorange between the location marker 12A and the receptor 11C; uses the time-of-arrival of the interface signal 19BC for determining a radio pseudorange between the location marker 12B and the receptor 11C; uses the time-of-arrival of the interface signal 19AD for determining a radio pseudorange between the location marker 12A and the receptor 11D; and uses the time-of-arrival of the interface signal 19BD for determining a radio pseudorange between the location marker 12B and the receptor 11D.

When no GPS signals 21–25 are receivable or when radio ranging is preferred, the hybrid pseudorange processor 108 (FIG. 4) in the base station 16 uses the four radio pseudoranges determined from the interface signals 19AA, 19AB, 19AC, and 19AD with the equation 1 above for determining the location of the first location marker 12A and the object 14. Similarly, the hybrid pseudorange processor 108 (FIG. 4) uses the four radio pseudoranges determined from the interface signals 19BA, 19BB, 19BC, and 19BD with the equation 1 above for determining the location of the second location marker 12B and the location and transit time of the first receptor 11A. Note that the direct marker signal 68 between the second location marker 12B and the receptor 11A is actually a direct connection. The location and transmit time for the receptor 11A can then be used with the time-of-arrival of the radio interface signals 19AA, 19AB, 19AC, and 19AD in the determination of the corresponding radio pseudoranges in the equation 1 above. A benefit of locating the second location marker 12B with the first receptor 11A is that the first receptor 11A can then be mobile. For a two dimensional location of the object 14 or the first receptor 11A or when altitude information is available, three radio pseudoranges are sufficient. Moreover, for each GPS pseudorange that is provided by the location marker 12A or 12B, one fewer radio pseudorange need be provided for locating the object 14 or the receptor 11A.

Figure 6:
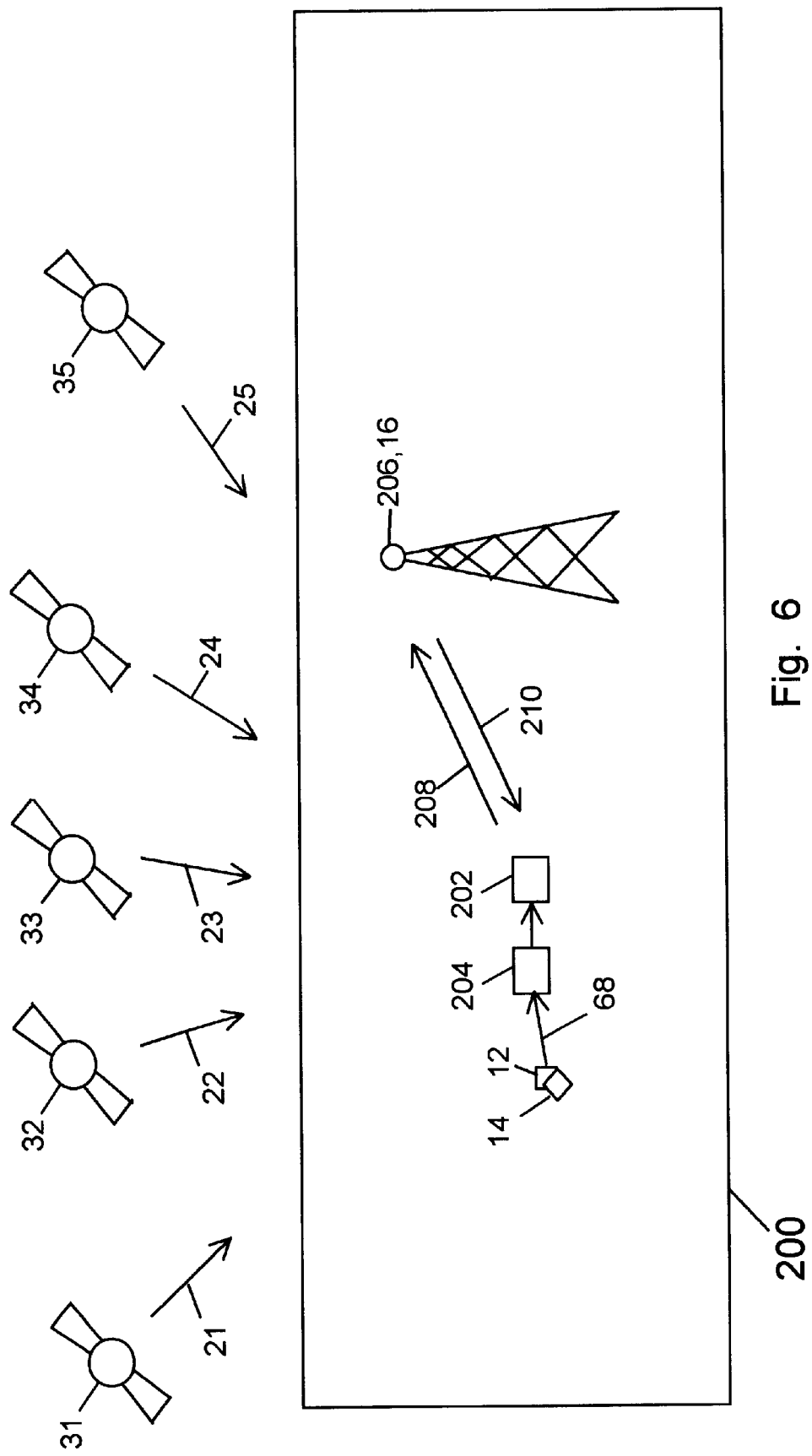
FIG. 6 is a diagram illustrating a hybrid location system of the present invention using a cellular telephone and a cell site transceiver.

FIG. 6 illustrates a hybrid location system of the present invention referred to by a reference number 200. The system 200 includes at least one of the location marker 12 located with at least one object 14, respectively, a cellular telephone 202 coupled by a cellphone translator 204 to the location marker 12, a cell site transceiver 206, and the base station 16. The location marker 12 receives GPS signals 21–25 and determines GPS pseudoranges as described above. The location marker 12 issues the direct marker signal 68 having the marker PRN code sequence modulated with data for the GPS pseudoranges, marker identification, and object information as described above. The cellphone translator 204 translates the direct marker signal 68 into a cellphone input format and issues a representative cellphone marker signal to the cellular telephone 202. The cellular telephone 202 transmits an uplink cellphone signal 208 having the marker PRN code sequence modulated with data for the GPS pseudoranges, marker identification, and object information to the cell site transceiver 206. The cell site transceiver 206 passes the GPS pseudoranges, marker identification, and object information to the radio pseudorange detector 104 (FIG. 3) in the base station 16. The radio pseudorange detector 104 (FIG. 3) uses the time-of arrival of the uplink cellphone signal 208 for determining a radio pseudorange between the cellular telephone 202 and the cell site transceiver 26 as described above for the location marker 12 and the receptor 11, respectively. The hybrid pseudorange processor 108 (FIG. 3) in the base station 16 then uses the radio pseudorange for the uplink cellphone signal 208 and three GPS pseudoranges for determining the location of the object 14 as described above in the equations 1 and 2.

The uplink cellphone signal 208 and a downlink cellphone signal 210 enable the cellular telephone 202 within a local area served by the cell site transceiver 206 to communicate in a conventional way through the cell site transceiver 206 into the worldwide telephone system. Such cell site transceiver 206 is available throughout most of the industrialized world. For example, in and around San Jose, Calif., suitable cell site transceiver stations 206 are operated and maintained by GTE Wireless Mobilnet and located every few miles. The downlink cellphone signal 208 and the uplink cellphone signal 210 use the cellular telephone signal formats and protocols that are specified by the entity controlling the cell site transceiver 206.

The teachings of the U.S. Pat. No. 5,920,287 by Belcher et al. entitled "Radio Location System for Precisely Tracking Objects by RF Transceiver Tags Which Randomly and Repetitively Emit Wideband Identification Signals" is incorporated herein by reference. The advantage of the use of a short pseudorandom code, as defined in Belcher et al., to determine the first-received signal in a multipath rich environment is particularly well suited to the operational circumstances encountered in a cellular network. Such signaling can be integrated into the basic operating channel as a digital preamble, offered periodically according to any of a number of rules, such as: 1) every 15 seconds, or 2) whenever there is a restart of the speech. Alternatively, it can be sent over the cellular control channel as described by LaDue, in U.S. Pat. Nos. 5,594,740 and 5,889,474. Accordingly, the U.S. Pat. No. 5,594,740 entitled "Wireless Communications Application Specific Enabling Method and Apparatus" and U.S. Pat. No. 5,889,474 entitled "Method and Apparatus for Transmitting Subject Status Information Over a Wireless Communications Network" both by LaDue are incorporated herein by reference. The operational advantage of using the cellular control channel for delivering pseudorange information is that it is readily available and the data can be easily incorporated into the channel.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for locating an object, comprising:
   a first receptor for receiving radio signals and responsively issuing representative respective interface signals;
   a second receptor for receiving radio signals and responsively issuing respective interface signals;
   a first location marker located at said object, the first location marker including a GPS pseudorange detector for determining a first GPS pseudorange and a transmitter for transmitting a first of said radio signals including information for said first GPS pseudorange;
   a second location marker located with the first receptor, the second location marker for transmitting a second of said radio signals; and:
   a base station for receiving a first of said interface signals issued by the first receptor in response to said first radio signal and a second of said interface signals issued by the second receptor in response to said second radio signal; the base station including a radio pseudorange detector for using a time-of-arrival of said first interface signal for determining first radio pseudorange between the first location marker and the first receptor and determining a second radio pseudorange between the second location marker and the second receptor from a time-of-arrival of said second interface signal, and a hybrid pseudorange processor for using said first GPS pseudorange and said first and second radio pseudoranges in a determination of said location of said object.

2. The system of claim 1, wherein:
   the second location marker is further for issuing a direct conducted signal to the first receptor;
   the first receptor is further for issuing a representative third interface signal responsive to said direct signal;
   said radio pseudorange detector is further for determining a third pseudorange between the second location marker and the first receptor from a time-of-arrival of said third interface signal; and
   said hybrid pseudorange processor is further for using said third pseudorange for calculating said location of the first receptor.

3. A system for locating an object, comprising:

a first and a second receptor for receiving radio signals and issuing interface signals, said interface signals responsive respectively to said radio signals;

a first and a second location marker, the first location marker located at said object for transmitting a first of said radio signals, the second location marker located at said first receptor for transmitting a second of said radio signals; and a base station for receiving a first of said interface signals issued by the first receptor in response to said first radio signal and a second said interface signal issued by the second receptor in response to said second radio signal, the base station including a radio pseudorange detector for using a time-of-arrival of said first interface signal for determining a first radio pseudorange between the first location marker and the first receptor and using a time-of-arrival of said second interface signal for determining a second radio pseudorange between the second location marker and the second receptor, and a pseudorange processor for using said second radio pseudorange for determining a location of the first receptor and using said location of the first receptor with said first radio pseudorange for determining said location of said object.

4. A method for locating an object, comprising steps of:

determining a first GPS pseudorange with a first location marker at a location of said object;

transmitting a first radio signal including information for said first GPS pseudorange from said first location marker;

receiving said first radio signal at a first receptor and responsively issuing a representative first interface signal;

transmitting a second radio signal from a second location marker at a location of said first receptor;

receiving said second radio signal at a second receptor and responsively issuing a representative second interface signal;

receiving said second interface signal at said base station;

determining a first radio pseudorange between said first location marker and said first receptor from a time-of-arrival of said first interface signal;

determining a second radio pseudorange between said second location marker and said second receptor from a time-of-arrival of said second interface signal; and calculating said location of said object using said first GPS pseudorange and said first and second radio pseudoranges.

5. The method of claim 4, wherein:

issuing a direct conducted signal from said second location marker to said first receptor;

issuing a representative third interface signal responsive to said direct conducted signal from said first receptor to said base station;

determining a third pseudorange between said second location marker and said first receptor from a time-of-arrival of said third interface signal; and calculating said location of said first receptor using said third pseudorange.

6. A method for locating an object, comprising steps of:

transmitting a first and a second radio signal from a first and a second location marker, respectively, said first location marker at said location of said object;

receiving said first radio signal at a first receptor and responsively issuing a representative first interface signal;

receiving said second radio signal at a second receptor and responsively issuing a second representative interface signal, said second receptor at a location of said first location marker;

receiving said first and said second interface signals at a base station;

determining a first radio pseudorange between the first location marker and the first receptor from a time-of-arrival of said first interface signal;

determining a second radio pseudorange between the second location marker and the second receptor from a time-of-arrival of said second interface signal;

using said second radio pseudorange for determining a location of said first receptor; and using said location of said first receptor with said first radio pseudorange for determining said location of said object.

* * * * *